United States Patent
Lee et al.

(10) Patent No.: US 9,208,946 B2
(45) Date of Patent: Dec. 8, 2015

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon, Gyunggi-do (KR)

(72) Inventors: Seung Ho Lee, Gyunggi-do (KR); Jong Han Kim, Gyunggi-do (KR); Min Gon Lee, Gyunggi-do (KR); Yoon Hee Lee, Gyunggi-do (KR); Sung Hwan Lee, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 184 days.

(21) Appl. No.: 13/962,563

(22) Filed: Aug. 8, 2013

(65) Prior Publication Data

US 2014/0355177 A1     Dec. 4, 2014

(30) Foreign Application Priority Data

May 28, 2013  (KR) .................. 10-2013-0060443

(51) Int. Cl.
*H01G 4/008*   (2006.01)
*H01G 4/012*   (2006.01)
*H01G 4/30*    (2006.01)
*H01G 4/12*    (2006.01)
*H01G 4/005*   (2006.01)

(52) U.S. Cl.
CPC .............. *H01G 4/012* (2013.01); *H01G 4/008* (2013.01); *H01G 4/1209* (2013.01); *H01G 4/30* (2013.01); *H01G 4/005* (2013.01); *H01G 4/0085* (2013.01); *Y10T 29/417* (2015.01)

(58) Field of Classification Search
CPC .......... H01G 4/30; H01G 4/12; H01G 4/232; H01G 4/005; H01G 4/01; H01G 4/0085; H01G 4/1209; H01G 4/1218; H01G 4/018; H01G 4/06; H01G 4/10
See application file for complete search history.

(56) References Cited

U.S. PATENT DOCUMENTS

| | | | |
|---|---|---|---|
| 6,014,309 A | 1/2000 | Ueno et al. | |
| 2008/0212257 A1* | 9/2008 | Sakamoto et al. | 361/305 |
| 2011/0157766 A1 | 6/2011 | Cho et al. | |
| 2012/0057271 A1* | 3/2012 | Oh et al. | 361/321.2 |
| 2012/0127626 A1* | 5/2012 | Chang et al. | 361/301.4 |

FOREIGN PATENT DOCUMENTS

| | | |
|---|---|---|
| JP | 10-312933 A | 11/1998 |
| KR | 10-2011-0073989 A | 6/2011 |

* cited by examiner

*Primary Examiner* — Dion R Ferguson
(74) *Attorney, Agent, or Firm* — McDermott Will & Emery LLP

(57) ABSTRACT

There is provided a multilayer ceramic electronic component including a ceramic body including a plurality dielectric layers stacked thereon, a plurality of internal electrodes formed to be exposed to both end surface of the ceramic body, having the dielectric layer interposed therebetween, and external electrodes formed on the end surfaces of the ceramic body and electrically connected to the internal electrodes, respectively, wherein connectivity of the internal electrode is equal to or greater than 87%.

12 Claims, 3 Drawing Sheets

MULTILAYER CERAMIC ELECTRONIC COMPONENT AND METHOD OF MANUFACTURING THE SAME

CROSS-REFERENCE TO RELATED APPLICATION

This application claims the priority of Korean Patent Application No. 10-2013-0060443 filed on May 28, 2013, in the Korean Intellectual Property Office, the disclosure of which is incorporated herein by reference.

BACKGROUND OF THE INVENTION

1. Field of the Invention

The present invention relates to a multilayer ceramic electronic component and a method of manufacturing the same.

2. Description of the Related Art

Examples of electronic components formed of ceramic materials include a capacitor, an inductor, a piezoelectric element, a varistor, a thermistor, and the like.

Multilayer ceramic capacitors (MLCCs), ceramic electronic components, have a small size and high capacitance and are easily mounted on an electronic device.

MLCCs are chip-type capacitors mounted on a printed circuit board (PCB) of various electronic products such as imaging devices such as a liquid crystal display (LCD) and a plasma display panel (PDP), computers, personal digital assistants (PDAs), and portable phones, to be used for charging or discharging electricity.

The MLCC may include a plurality of stacked dielectric layers, and internal electrodes having different polarities and disposed to face each other, having the dielectric layer interposed therebetween, and external electrodes electrically connected to the internal electrodes.

Recently, with the development of small-sized electronic products, an MLCC is also required to have a small size and high capacitance.

Thus, various methods have been attempted for thinned and multilayer dielectric layers and internal electrode. Recently, as the thickness of a dielectric layer is reduced, multilayer ceramic electronic components in which the number of stacked layers is increased have been manufactured.

To realize such a high degree of capacitance, the thicknesses of a dielectric layer and internal electrode are reduced to allow the number of stacked layers to be increased by an amount equal to the degree to which the thickness of the MLCC has been reduced.

However, as dielectric layers and internal electrodes are thinned, the thicknesses of the internal electrodes may be different. Due to the reasons as described above, adjacent internal electrodes may be disconnected and may be partially disconnected, and the area of the internal electrodes is reduced by an amount of the disconnected portions, thereby reducing capacitance.

In addition, main consideration for MLCCs may be occurrence of internal cracks as internal stress is increased due to mismatch of contraction behavior between an internal electrode and a dielectric layer as well as capacitance.

In particular, when residual carbonaceous materials are not easily removed due to fine grain of a dielectric layer during the manufacture of electronic products, various types of cracks may occur in a ceramic body during firing the product, which is a main factor of degrading product reliability.

The following Related Art Document discloses a multilayer ceramic capacitor that prevents cracks from occurring and ensures connectivity of an electrode to have high capacitance, but does not disclose numerical definition of limiting connectivity of internal electrodes.

RELATED ART DOCUMENT

Japanese Patent Laid-Open Publication No. 1998-312933

SUMMARY OF THE INVENTION

An aspect of the present invention provides a scheme for preventing occurrence of internal cracks during firing and improving reliability while obtaining high capacitance by adjusting connectivity of an internal electrode.

According to an aspect of the present invention, there is provided a multilayer ceramic electronic component including a multilayer ceramic electronic component including a ceramic body including a plurality of dielectric layers stacked therein, a plurality of internal electrodes alternately exposed to both end surfaces of the ceramic body, having the dielectric layer interposed therebetween, and external electrodes formed on the end surfaces of the ceramic body and electrically connected to the internal electrodes, respectively, wherein connectivity of the internal electrode, represented by the following expression, is equal to or greater than 87%:

Connectivity=a total length of a cross section of actually formed conductive paste portions/an overall length of a cross section of the internal electrode. [Expression]

An average particle size distribution (D50) of ceramic powder particles included in the dielectric layers may be equal to or less than 120 nm.

The connectivity of the internal electrode may be obtained by changing a particle size of a nickel (Ni) metal powder of the conductive paste for formation of the internal electrode.

An average particle size distribution (D50) of the nickel metal powder may be equal to or less than 120 nm.

When a region including the dielectric layers and the internal electrodes, contributing to formation of capacitance of a capacitor in the ceramic body, is referred to as an active region, a ratio of connectivity of the internal electrode of a central portion of the active region to that of upper and lower portions thereof may satisfy a range of $0.87 \leq$ connectivity of central portion/connectivity of upper and lower portions $\leq 0.93$.

An average thickness of the dielectric layers may be from 0.2 to 0.6 μm.

An average thickness of first and second internal electrodes forming the internal electrode may range from 0.1 to 0.5 μm.

According to another aspect of the present invention, there is provided a method of manufacturing a multilayer ceramic electronic component, the method including preparing a multilayer structure by stacking a plurality of ceramic green sheets including internal electrodes formed thereon on one another such that the internal electrodes are offset from each other in a length direction, having the ceramic green sheet therebetween, and compressing the stacked ceramic green sheets, preparing a ceramic body by cutting the multilayer structure into regions corresponding to respective one chips such that the internal electrodes are alternately exposed to both end surfaces of the ceramic body, and forming an external electrodes on the end surfaces of the ceramic body so as to be electrically connected to the internal electrodes, respectively, wherein connectivity of the internal electrode, represented by the following expression, is equal to or greater than 87%:

Connectivity=a total length of a cross section of actually formed conductive paste portions/an overall length of a cross section of the internal electrode. [Expression]

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Hereinafter, embodiments of the present invention will be described in detail with reference to the accompanying drawings. The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

Hereinafter, a multilayer ceramic electronic component, specifically, a multilayer ceramic capacitor according to an embodiment of the present invention will be described, but the present invention is not limited thereto.

Multilayer Ceramic Capacitor

Figure 1:
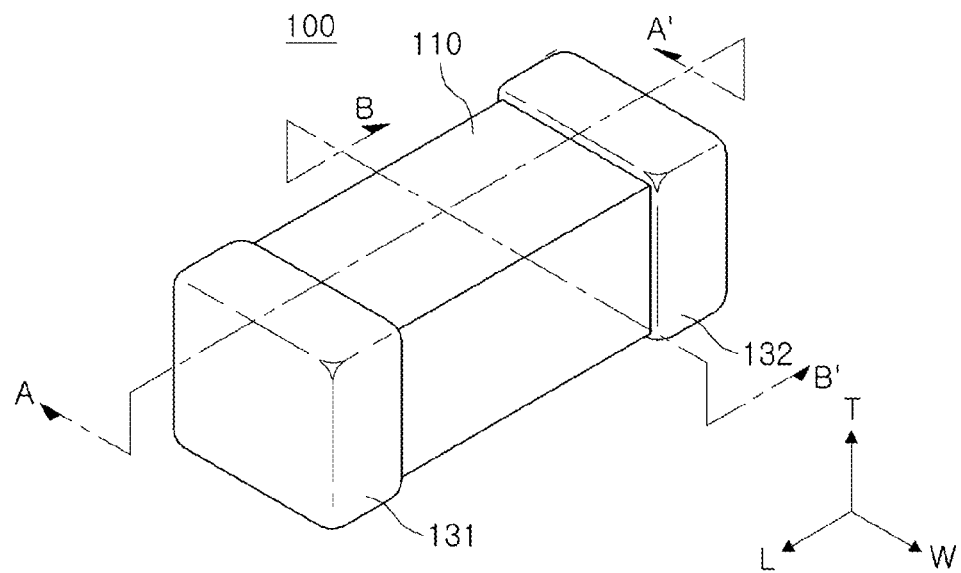
FIG. 1 is a schematic perspective view of a multilayer ceramic capacitor according to an embodiment of the present invention.
Figure 2:
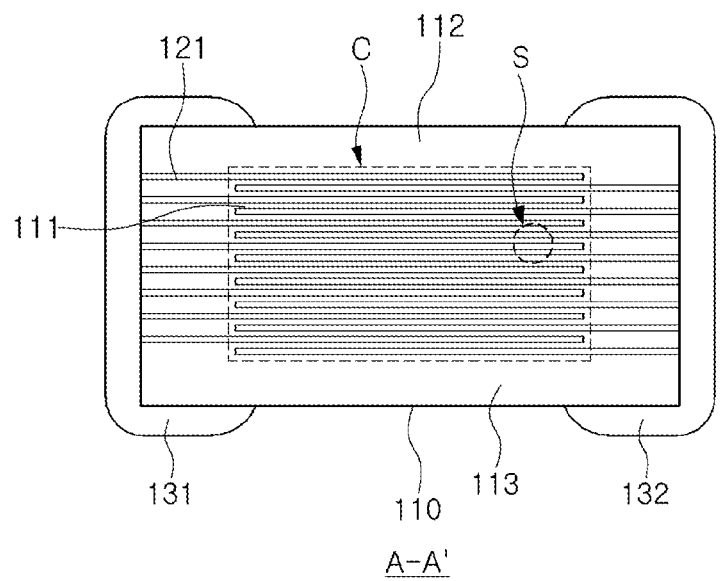
FIG. 2 is a cross-sectional view of the multilayer ceramic capacitor taken along line A-A' of FIG. 1.
Figure 3:
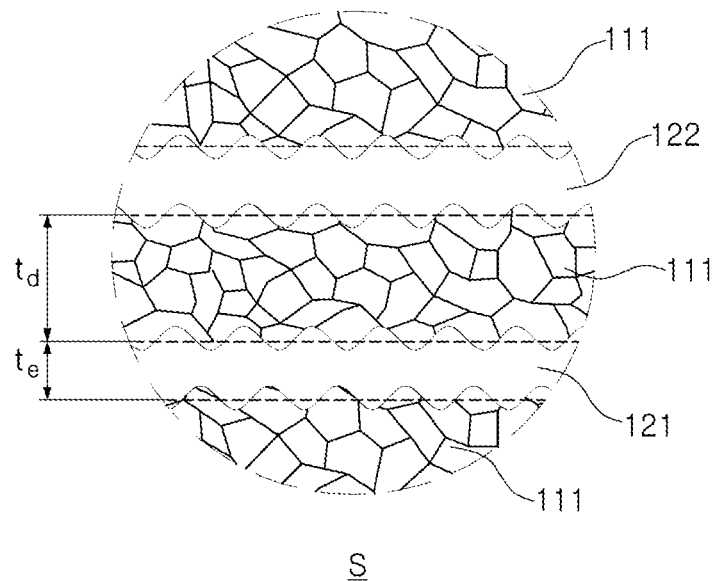
FIG. 3 is an enlarged view of region S of FIG. 2.

FIG. 1 is a schematic perspective view of a multilayer ceramic capacitor 100 according to an embodiment of the present invention. FIG. 2 is a cross-sectional view of the multilayer ceramic capacitor 100 taken along line A-A' of FIG. 1. FIG. 3 is an enlarged view of region S of FIG. 2.

Referring to FIGS. 1 through 3, the multilayer ceramic capacitor 100 according to the present embodiment includes a ceramic body 110 including a plurality of dielectric layers 111 stacked thereon, a plurality of first and second internal electrodes 121 and 122, and first and second external electrodes 131 and 132.

Connectivity of an internal electrode may refer to a coating ratio of the internal electrode, and in detail, may be defined as a ratio of a total length of a cross section of actually formed conductive paste portions/an overall length of a cross section of the internal electrode.

In general, the connectivity of the internal electrode is in the range of 65 to 75%. According to the present embodiment, the connectivity of the internal electrode of the multilayer ceramic capacitor 100 is 87% or more.

Unlike in the present embodiment, when the connectivity of the internal electrode of the multilayer ceramic capacitor 100 is less than 87%, the thickness of a dielectric layer is not uniform due to a lump of the internal electrode to adversely affect withstand voltage characteristics.

The ceramic body 110 is formed by staking the plurality of dielectric layers 111 in a thickness direction and firing the stacked dielectric layers. The shape and size of the ceramic body 110 and the number of stacked dielectric layers 111 are not limited to the present embodiment illustrated in the diagrams.

The plurality of dielectric layers 111 forming the ceramic body 110 may be in a sintered state, and thus, the plurality of dielectric layers 111 may be integrated with each other such that it is difficult to confirm a boundary between dielectric layers 111 adjacent to each other without a scanning electron microscope (SEM).

The shape of the ceramic body 110 is not particularly limited. For example, the ceramic body 110 may have a hexahedral shape.

For convenience of description, according to the present embodiment, two surfaces of the ceramic body 110 opposing each other in a thickness direction are defined as two main surfaces, two surfaces connecting the two main surfaces to each other and opposing each other in a length direction are defined as two end surfaces, and two surfaces perpendicular to the end surfaces and opposing each other in a width direction are defined as two side surfaces.

In order to clearly describe the present embodiment, directions related to the ceramic body 110 are defined. That is, L, W, and T illustrated in FIG. 1 indicate the length direction, the width direction, and the thickness direction, respectively.

Here, the thickness direction may have the same concept as that of a stacking direction in which the plurality of dielectric layers 111 are stacked.

A dielectric layer 111 may include a ceramic power with a high dielectric constant, for example, barium titanate ($BaTiO_3$)-based or strontium titanate ($SrTiO_3$)-based powder. The embodiments of the present invention are not limited thereto as long as the dielectric layer 111 may obtain sufficient capacitance.

In addition to the ceramic powder, the dielectric layer 111 may further include various types of ceramic additives such as a transition metal oxide, carbide, a rare earth element, magnesium (Mg), or aluminum (Al), an organic solvent, a plasticizer, a binder, a dispersing agent, etc. as needed.

In this case, an average particle size distribution (D50) of the ceramic powder may be equal to or less than 120 nm. When the average particle size distribution (D50) exceeds 120 nm, withstand voltage characteristics may be degraded.

In addition, an average thickness $T_d$ of the dielectric layer 111 may be arbitrarily changed according to a design of capacitance of the multilayer ceramic capacitor 100. For example, one layer may be configured to have a thickness of 0.2 to 0.6 μm, but the embodiments of the present invention are not limited thereto.

Here, when the average thickness $T_d$ of the dielectric layer 111 is less than 0.2 μm, internal cracks may occur regardless of connectivity of internal electrodes, thereby degrading reliability of a multilayer ceramic capacitor. When the average thickness $T_d$ of the dielectric layer 111 exceeds 0.6 μm, a capacitance may be reduced.

The ceramic body 110 may include an active region C that contributes to formation of capacitance of a capacitor and includes the dielectric layers 111 and the first and second internal electrodes 121 and 122, and upper and lower cover layers 112 and 113, that is, upper and lower margin portions respectively formed on and below the active region C.

The upper and lower cover layers 112 and 113 may contain the same material as and may have the same configuration as those of the dielectric layer 111 of the active region C, except that the upper and lower cover layers 112 and 113 do not include an internal electrode. In addition, a single dielectric layer or two or greater dielectric layers may be stacked on an upper surface and lower surface of the active region C in the thickness direction.

The upper and lower cover layers 112 and 113 may basically prevent the first and second internal electrodes 121 and 122 from being damaged due to physical or chemical stress.

The first and second internal electrodes 121 and 122 have different polarities and are formed by printing a conductive paste including conductive metal on the dielectric layer 111 by a predetermined thickness.

In this case, the first and second internal electrodes 121 and 122 may be formed to face each other, having the dielectric layer 111 interposed therebetween, so as to be alternately exposed through both end surfaces of the ceramic body 110 in the multilayer direction in which the dielectric layers 111 are stacked. In this case, the first and second internal electrodes 121 and 122 may be electrically insulated from each other by the dielectric layer 111 formed therebetween.

In addition, portions of the first and second internal electrodes 121 and 122, exposed through the two end surfaces of the ceramic body 110, may contact the first and second external electrodes 131 and 132 so as to be electrically connected to the first and second external electrodes 131 and 132, respectively.

Thus, when a voltage is applied to the first and second external electrodes 131 and 132, electric charges are accumulated between the first and second internal electrodes 121 and 122 facing each other. In this case, capacitance of the multilayer ceramic capacitor 100 is proportional to an area of the active region C, in which the first and second internal electrodes 121 and 122 are overlapped with each other.

The connectivity of the first and second internal electrodes 121 and 122 may be obtained by changing a particle size of a nickel (Ni) metal powder of the conductive paste for formation of the internal electrode.

According to the present embodiment, average particle size distribution (D50) of the Ni metal power, for maintaining 87% or greater of connectivity of the internal electrode, may be equal to or less than 120 nm.

A thickness $t_e$ of each of the first and second internal electrodes 121 and 122 may be determined according to use thereof. For example, the thickness $t_e$ may be in the range of 0.1 through 0.5 μm in consideration of the size of the ceramic body 110, but the embodiments of the present invention are not limited thereto.

When the average thickness $t_e$ of each of the first and second internal electrodes 121 and 122 is less than 0.1 μm, it is difficult to ensure the connectivity of the internal electrode in a case in which an average thickness of the dielectric layer 111 is equal to or less than 0.6 μm, and thus, it may be difficult to obtain capacitance.

On the other hand, the average thickness $t_e$ of each of the first and second internal electrodes 121 and 122 exceeds 0.5 μm, the thickness of the electrode is increased, thereby reducing effective capacitance of a capacitor.

In addition, the number of stacked first and second internal electrodes 121 and 122 may be determined according to use thereof, and for example, may be 200 or more, but the embodiments of the present invention are not limited thereto.

In addition, the conductive metal included in the conductive paste for formation of the first and second internal electrodes 121 and 122 may be one of silver (Ag), palladium (Pd), platinum (Pt), nickel (Ni), and copper (Cu), or an alloy thereof, but the embodiments of the present invention are not limited thereto.

In addition, as a method of printing the conductive paste, a screen printing method, a gravure printing method, or the like may be used, but the embodiments of the present invention are not limited thereto.

The first and second external electrodes 131 and 132 are formed on both end surfaces of the ceramic body 110, respectively, and contact the exposed portions of the first and second internal electrodes 121 and 122 to be electrically connected to the first and second internal electrodes 121 and 122, respectively.

The first and second external electrodes 131 and 132 may be formed of a conductive paste including a conductive metal. Examples of the conductive metal may include Ag, Ni, and Cu, or an alloy thereof, but the embodiments of the present invention are not limited thereto.

First and second plating layers (not shown) may be formed on the first and second external electrodes 131 and 132 as needed.

When the multilayer ceramic capacitor 100 is mounted on a PCB via solder, the first and second plating layers may reinforce bonding strength between the multilayer ceramic capacitor 100 and the PCB.

For example, the first and second conductive layers may include a Ni plating layer formed on the first and second external electrodes 131 and 132, and a tin (Sn) plating layer formed on the Ni plating layer, but the embodiments of the present invention are not limited thereto.

Figure 4:
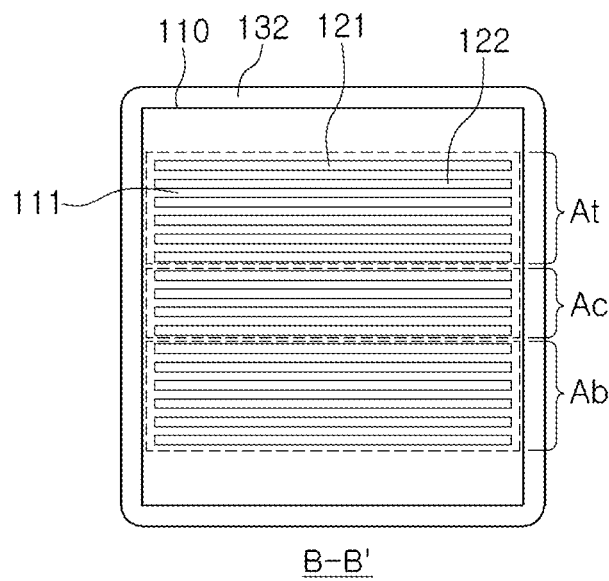
FIG. 4 is a cross-sectional view of the multilayer ceramic capacitor taken along line B-B' of FIG. 1.

FIG. 4 is a cross-sectional view of the multilayer ceramic capacitor 100 taken along line B-B' of FIG. 1.

Referring to FIG. 4, in the active region C of the ceramic body 110, a ratio of connectivity of an internal electrode of a central portion Ac to that of upper and lower portions At and Ab may satisfy a range of 0.87≤connectivity of central portion/connectivity of upper and lower portions≤0.93.

Thus, by adjusting the ratio of connectivity of the internal electrode according to positions of portions of the active region C, a path for a residual carbonaceous material is formed in the central portion Ac of the active region C, in which it is more difficult to remove residual, than in the upper and lower portions At and Ab of the active region C, and thus, a residual carbonaceous material may be easily removed to relieve stress and occurrence of internal cracks may be prevented, thereby improving reliability in the capacitor.

In this case, when a ratio of the connectivity of central portion to connectivity of upper and lower portions is less than 0.87, the occurrence of cracks may be prevented, but capacitance may be reduced.

On the other hand, when a ratio of the connectivity of a central portion to connectivity of upper and lower portions exceeds 0.93, capacitance may be increased, but cracks may not be able to be prevented.

Method of Manufacturing Multilayer Ceramic Capacitor

Figure 5:
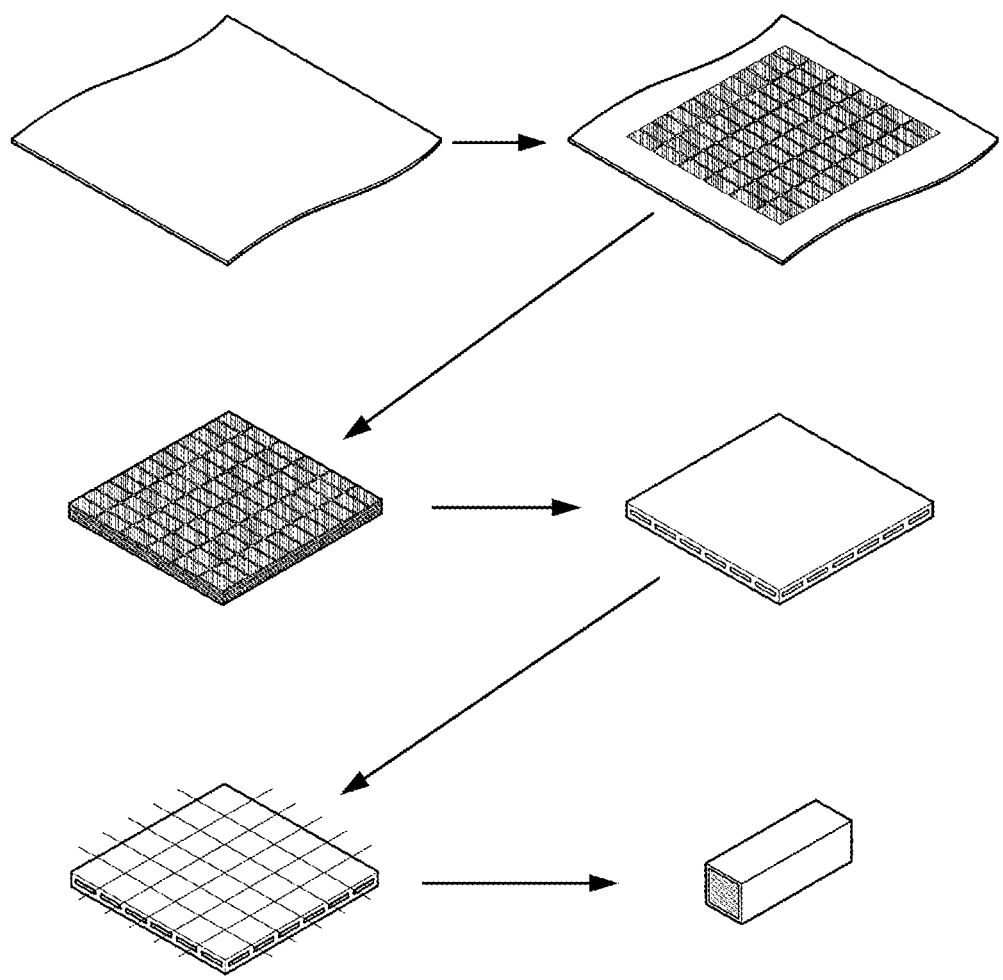
FIG. 5 is a diagram illustrating a method of manufacturing a multilayer ceramic capacitor according to an embodiment of the present invention.

FIG. 5 is a diagram illustrating a method of manufacturing a multilayer ceramic capacitor according to an embodiment of the present invention.

Referring to FIG. 5, a method of manufacturing a multilayer ceramic capacitor according to an embodiment of the present invention will be described.

First, a plurality of green sheets are prepared.

The green sheet may be a ceramic green sheet and may be prepared to have a thickness of several μm by mixing ceramic powder, a solvent, a plasticizer, a binder, a dispersing agent, and the like to prepare a slurry using a basket mill, etc., coating the slurry on a carrier film via a process such as doctor blade or the like, and drying a resulting structure, thereby forming the dielectric layer 111 of the ceramic body 110.

In this case, average particle size distribution (D50) of the ceramic powder included in the green sheet may be equal to or less than 120 nm. In addition, an average thickness $t_d$ of the green sheet may range from 0.2 to 0.6 μm.

Then, a conductive paste is dispensed on the green sheet and a squeegee is moved thereon to form an internal electrode film.

The conductive paste may include a metal powder, a ceramic powder, a silica ($SiO_2$) powder, etc.

The metal powder may be one of Ag, Pd, Pt, Ni, and Cu, or an alloy thereof.

On the other hand, an internal electrode film may be formed by printing the conductive paste on the green sheet using a screen printing method, a gravure printing method, or the like.

The internal electrode film may be provided to form the first and second internal electrodes 121 and 122. Average particle size distribution (D50) of the metal powder may be equal to or less than 120 nm. An average thickness $t_e$ of the internal electrode film may range from 0.1 to 0.5 μm.

Then, the green sheet on which the internal electrode film is formed is separated from the carrier film, a plurality of green sheets are alternately stacked on one another such that the internal electrode films are offset from each other in a length direction, having the green sheet interposed therebetween, a high temperature and a high pressure are applied thereto to prepare a multilayer structure.

Then, the multilayer structure is cut to regions corresponding to respective one chips such that the internal electrode films are alternately exposed through both end surfaces, and fired and polished to prepare the ceramic body 110 in which the first and second internal electrodes 121 and 122 are alternately exposed through both end surfaces.

In this case, connectivity of the internal electrode of the ceramic body 110 may be equal to or greater than 87%.

In addition, when a region including the dielectric layer 111 and the first and second internal electrodes 121 and 122, contributing to formation of capacitance of a capacitor in the ceramic body 110, is referred to as the active region C, a ratio of connectivity of an internal electrode of a central portion of the active region C to that of upper and lower portions thereof may satisfy a range of 0.87≤connectivity of central portion/connectivity of upper and lower portions≤0.93.

Then, the first and second external electrodes 131 and 132 are formed on both end surfaces of the ceramic body 110 to respectively contact and be electrically connected to exposed portions of the plurality of first and second internal electrodes 121 and 122 exposed thereto.

In this case, a plating layer may be further formed on the first and second external electrodes 131 and 132, as needed.

Experimental Example

Multilayer ceramic capacitors according to embodiments of the present invention and comparative examples are manufactured using the following method, but the embodiments of the present invention are not limited thereto.

Here, a conductive paste for an internal electrode was prepared using a nickel metal powder having average particle size distribution (D50) of 80 to 120 nm, and the content of nickel metal powder is 45 to 55% based on a total amount.

The conductive paste for the internal electrode was printed on the green sheet including a ceramic powder particle having an average particle size distribution (D50) of 80 to 120 nm using a screen printing method to form the internal electrode, and 200 to 270 layers of green sheets were stacked to prepare a multilayer structure.

Then, the multilayer structure was compressed and cut to prepare a 1005-sized chip, and the chip was fired under a reduction atmosphere equal to or less than $H_2$ of 0.1% at a temperature of 1050 to 1200° C. to prepare a ceramic body.

Then, the ceramic body was subjected to an external electrode formation process and a plating process to thereby prepare a multilayer ceramic capacitor.

In this case, when a cross section of the multilayer ceramic capacitor was observed, an average thickness of the internal electrode ranged from 0.1 to 0.5 μm.

Table 1 below shows comparison of Comparative Examples 1 to 3 and 8 to 10 and Embodiments 4 to 7 in terms of whether cracks occur due to thermal shock and whether reliability is satisfied, and shows comparison of capacitance, according to connectivity of a central portion to connectivity of upper and lower portions. In this case, samples were prepared by changing a ratio of connectivity of a central portion to connectivity of upper and lower portions using the aforementioned method.

Here, according to Comparative Examples, the samples were prepared in such a way that a ratio of connectivity of a central portion to connectivity of upper and lower portions was outside of the range of 0.87 to 0.93.

In addition, when the cracks occur in interfaces between the internal electrodes and upper and lower layers of the ceramic body due to difference in thermal expansion of the dielectric layer and the internal electrodes when thermal shocks such as during mounting were applied to the ceramic body. Whether the cracks due to thermal shocks occur were evaluated by preparing various samples of the ceramic body, immersing the samples in a lead furnace at a temperature of 320° C. for two seconds, and then, observing the samples using a microscope at magnification of 50 to 1,000.

TABLE 1

| Sample No. | Connectivity of central portion/Connectivity of upper and lower portions | Whether cracks occur | Whether reliability is satisfied | Capacitance |
| --- | --- | --- | --- | --- |
| 1* | 0.80 | No | ⊚ | X |
| 2* | 0.83 | No | ⊚ | X |
| 3* | 0.86 | No | ⊚ | X |
| 4 | 0.87 | No | ⊚ | ○ |
| 5 | 0.89 | No | ⊚ | ○ |
| 6 | 0.91 | No | ○ | ⊚ |
| 7 | 0.93 | No | ○ | ⊚ |
| 8* | 0.95 | Yes | X | ⊚ |
| 9* | 0.97 | Yes | X | ⊚ |
| 10* | 1.00 | Yes | X | ⊚ |

*Comparative Example, the range of which is outside of that of the present invention
X: Poor (equal to or less than 75%)
○: Good (75 to 85%)
⊚: Very good (equal to or greater than 85%)

As seen from Table 1 above, with regard to samples 4 to 7 according to embodiments of the present invention, a ratio of connectivity of a central portion to connectivity of upper and lower portions satisfies the range according to an embodiment of the present invention, and thus, internal cracks do not occur, reliability is satisfied, and capacitance is also relatively excellent.

On the other hand, with regard to samples 1 to 3 according to Comparative Examples, the ratio of connectivity of a central portion to connectivity of upper and lower portions was less than 0.87, and thus, internal cracks did not occur and reliability was satisfied, but sufficient capacitance was not obtained.

With regard to samples 8 to 10 according to Comparative Examples, the ratio of connectivity of a central portion to connectivity of upper and lower portions exceeded 0.93, and thus, obtaining capacitance was not problematic, but internal cracks occurred, and reliability was not satisfied.

That is, when a ratio of connectivity of a central portion to connectivity of upper and lower portions was outside of the range of 0.87 to 0.93, sufficient capacitance was not obtained, internal cracks occurred, and reliability was not satisfied.

Thus, according to an embodiment of the present invention, when a multilayer ceramic capacitor having high capacitance is manufactured using a fine dielectric substance and materials for internal electrode, a path for a residual carbonaceous material is formed in a central electrode of a ceramic body while obtaining high capacitance so as to prevent occurrence of cracks due to thermal shocks, by adjusting a ratio of connectivity of central portion to connectivity of upper and lower portions to satisfy a range from 0.87 to 0.93, and thus, a multilayer ceramic electronic component having excellent reliability and high capacitor may be implemented.

Table 2 below shows comparison of Comparative Examples in terms of whether cracks occur due to thermal shock, and whether reliability is satisfied, and shows comparison of capacitance, according to a thickness of a dielectric layer. In this case, samples were prepared by changing a ratio of connectivity of a central portion to connectivity of upper and lower portions, simultaneously with changing the thickness of the dielectric layer, using the aforementioned method.

Here, according to Comparative Examples, the samples were prepared in such a way that the ratio of connectivity of a central portion to connectivity of upper and lower portions was outside of the range of 0.87 to 0.93 or the thickness of the dielectric layer was less than 0.2 μm or greater than 0.6 μm.

TABLE 2

| Sample No. | Thickness of dielectric layer (μm) | Connectivity of central portion/ Connectivity of upper and lower portions | Whether cracks occurred | Whether reliability was satisfied | Capacitance |
|---|---|---|---|---|---|
| 1* | 0.6 | 0.8 | No | ⊚ | X |
| 2* | 0.6 | 0.83 | No | ⊚ | X |
| 3* | 0.6 | 0.86 | No | ⊚ | X |
| 4 | 0.6 | 0.87 | No | ⊚ | ○ |
| 5 | 0.6 | 0.89 | No | ⊚ | ○ |
| 6 | 0.6 | 0.91 | No | ⊚ | ○ |
| 7 | 0.6 | 0.93 | No | ⊚ | ○ |
| 8* | 0.6 | 0.95 | Yes | X | ○ |
| 9* | 0.6 | 0.97 | Yes | X | ○ |
| 10* | 0.6 | 1.0 | Yes | X | ⊚ |
| 11* | 0.2 | 0.8 | No | ⊚ | X |
| 12* | 0.2 | 0.83 | No | ⊚ | X |
| 13* | 0.2 | 0.86 | No | ⊚ | X |
| 14 | 0.2 | 0.87 | No | ○ | ○ |
| 15 | 0.2 | 0.89 | No | ○ | ○ |
| 16 | 0.2 | 0.91 | No | ○ | ⊚ |
| 17 | 0.2 | 0.93 | No | ○ | ⊚ |
| 18* | 0.2 | 0.95 | Yes | X | ⊚ |
| 19* | 0.2 | 0.97 | Yes | X | ⊚ |
| 20* | 0.2 | 1.0 | Yes | X | ⊚ |
| 21* | 0.15 | 0.8 | Yes | X | ○ |
| 22* | 0.15 | 0.83 | Yes | X | ○ |
| 23* | 0.15 | 0.86 | Yes | X | ⊚ |
| 24* | 0.15 | 0.87 | Yes | X | ⊚ |
| 25* | 0.15 | 0.89 | Yes | X | ⊚ |
| 26* | 0.15 | 0.91 | Yes | X | ⊚ |
| 27* | 0.15 | 0.93 | Yes | X | ⊚ |
| 28* | 0.15 | 0.95 | Yes | X | ⊚ |
| 29* | 0.15 | 0.97 | Yes | X | ⊚ |
| 30* | 0.15 | 1.0 | Yes | X | ⊚ |
| 31* | 0.65 | 0.8 | No | ⊚ | X |
| 32* | 0.65 | 0.83 | No | ⊚ | X |
| 33* | 0.65 | 0.86 | No | ⊚ | X |
| 34* | 0.65 | 0.87 | No | ⊚ | X |
| 35* | 0.65 | 0.89 | No | ⊚ | X |
| 36* | 0.65 | 0.91 | No | ⊚ | X |
| 37* | 0.65 | 0.93 | No | ⊚ | X |
| 38* | 0.65 | 0.95 | Yes | X | X |
| 39* | 0.65 | 0.97 | Yes | X | X |
| 40* | 0.65 | 1.0 | Yes | X | X |

*Comparative Example, the range of which was outside of that of the present invention
X: Poor (equal to or less than 75%)
○: Good (75 to 85%)
⊚: Very good (equal to or greater than 85%)

As seen from Table 2 above, with regard to samples 4 to 7 and 14 to 17 according to embodiments of the present invention, a ratio of connectivity of a central portion to connectivity of upper and lower portions and a thickness of a dielectric layer satisfy the range according to an embodiment of the present invention, and thus, internal cracks do not occur, reliability is satisfied, and capacitance is also relatively excellent.

On the other hand, with regard to samples 1 to 3 and 11 to 13 according to Comparative Examples, a thickness of a dielectric layer satisfied the range according to an embodiment of the present invention. However, the ratio of connectivity of a central portion to connectivity of upper and lower portions of the internal electrode was less than 0.87, and thus, internal cracks did not occur, reliability was satisfied, but sufficient capacitance was not obtained.

With regard to samples 8 to 10 and 18 to 20 according to Comparative Example, a thickness of a dielectric layer satisfied the range according to an embodiment of the present invention. However, the ratio of connectivity of a central portion to connectivity of upper and lower portions of the internal electrode exceeded 0.93, and thus, there was a problem in terms of obtaining sufficient capacitance thereof, but internal cracks occurred, and reliability was not satisfied.

With regard to samples 21 to 30 according to Comparative Examples, a thickness of a dielectric layer was less than 0.2 μm, and thus, internal cracks occurred regardless of a ratio of connectivity of central portion to connectivity of upper and lower portions of the internal electrode, thereby reducing reliability.

With regard to samples 31 to 40 according to Comparative Examples, a thickness of a dielectric layer exceeded 0.6 μm, and thus, there was a problem in terms of obtaining sufficient capacitance regardless of a ratio of connectivity of central portion to connectivity of upper and lower portions.

Thus, according to embodiments of the present invention, when a multilayer ceramic capacitor having high capacitance is manufactured using a fine dielectric substance and materials for internal electrode, by adjusting a ratio of connectivity of central portion to connectivity of upper and lower portions to satisfy a range from 0.87 to 0.93 and adjusting a thickness of a dielectric layer to satisfy a range from 0.2 to 0.6 μm, a path for a residual carbonaceous material is formed in a central electrode of a ceramic body while obtaining high capacitance so as to prevent occurrence of cracks due to thermal shocks, and thus, a multilayer ceramic electronic component having excellent reliability and high capacitance may be implemented.

As set forth above, according to embodiments of the invention, connectivity of an internal electrode is adjusted to be equal to or greater than 87%, internal cracks are prevented during firing, and reliability is improved while obtaining high capacitance.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
a ceramic body including a plurality of dielectric layers stacked therein;
a plurality of internal electrodes alternately exposed to both end surfaces of the ceramic body, having the dielectric layer interposed therebetween; and
external electrodes formed on the end surfaces of the ceramic body and electrically connected to the internal electrodes, respectively,
wherein connectivity of the internal electrode, represented by the following expression, is equal to or greater than 87%:

Connectivity=a total length of a cross section of actually formed conductive paste portions/an overall length of a cross section of the internal electrode, and [Expression]

wherein $0.87 \leq$ connectivity of central portion/connectivity of upper and lower portions $\leq 0.93$, in which an active region is a region including the dielectric layers and the internal electrodes, contributing to formation of capacitance in the ceramic body, and connectivity of central portion/connectivity of upper and lower portions is a ratio of connectivity of the internal electrode of a central portion of the active region to that of upper and lower portions thereof.

2. The multilayer ceramic electronic component of claim 1, wherein an average particle size distribution (D50) of ceramic powder particles included in the dielectric layers is equal to or less than 120 nm.

3. The multilayer ceramic electronic component of claim 1, wherein the connectivity of the internal electrode is obtained by changing a particle size of a metal powder of the conductive paste for formation of the internal electrode.

4. The multilayer ceramic electronic component of claim 3, wherein an average particle size distribution (D50) of the metal powder is equal to or less than 120 nm.

5. The multilayer ceramic electronic component of claim 1, wherein an average thickness of the dielectric layers ranges from 0.2 to 0.6 μm.

6. The multilayer ceramic electronic component of claim 1, wherein an average thickness of first and second internal electrodes forming the internal electrode ranges from 0.1 to 0.5 μm.

7. A method of manufacturing a multilayer ceramic electronic component, the method comprising:

preparing a multilayer structure by stacking a plurality of ceramic green sheets including internal electrodes formed thereon on one another such that the internal electrodes are offset from each other in a length direction, having the ceramic green sheet interposed therebetween, and compressing the stacked ceramic green sheets;

preparing a ceramic body by cutting the multilayer structure into regions corresponding to respective one chips such that the internal electrodes are alternately exposed to both end surfaces of the ceramic body; and forming external electrodes on the end surfaces of the ceramic body so as to be electrically connected to the internal electrodes, respectively, wherein connectivity of the internal electrode, represented by the following expression, is equal to or greater than 87%:

Connectivity=a total length of a cross section of actually formed conductive paste portions/an overall length of a cross section of the internal electrode, and [Expression]

wherein $0.87 \leq$ connectivity of central portion/connectivity of upper and lower portions $\leq 0.93$, in which an active region is a region including the dielectric layers and the internal electrodes, contributing to formation of capacitance in the ceramic body, and connectivity of central portion/connectivity of upper and lower portions is a ratio of connectivity of the internal electrode of a central portion of the active region to that of upper and lower portions thereof.

8. The method of claim 7, wherein the preparing of the multilayer structure is performed such that an average particle size distribution (D50) of ceramic powder particles included in the ceramic green sheet is equal to or less than 120 nm.

9. The method of claim 7, wherein the connectivity of the internal electrode is obtained by changing a particle size of a metal powder of a conductive paste for formation of the internal electrode.

10. The method of claim 9, wherein an average particle size distribution (D50) of the metal powder is equal to or less than 120 nm.

11. The method of claim 7, wherein the preparing of the multilayer structure is performed to have an average thickness of the ceramic green sheet ranging from 0.2 to 0.6 μm.

12. The method of claim 7, wherein the preparing of the multilayer structure is performed to have an average thickness of first and second internal electrodes forming the internal electrode, ranging from 0.1 to 0.5 μm.

* * * * *